Patented Nov. 16, 1948

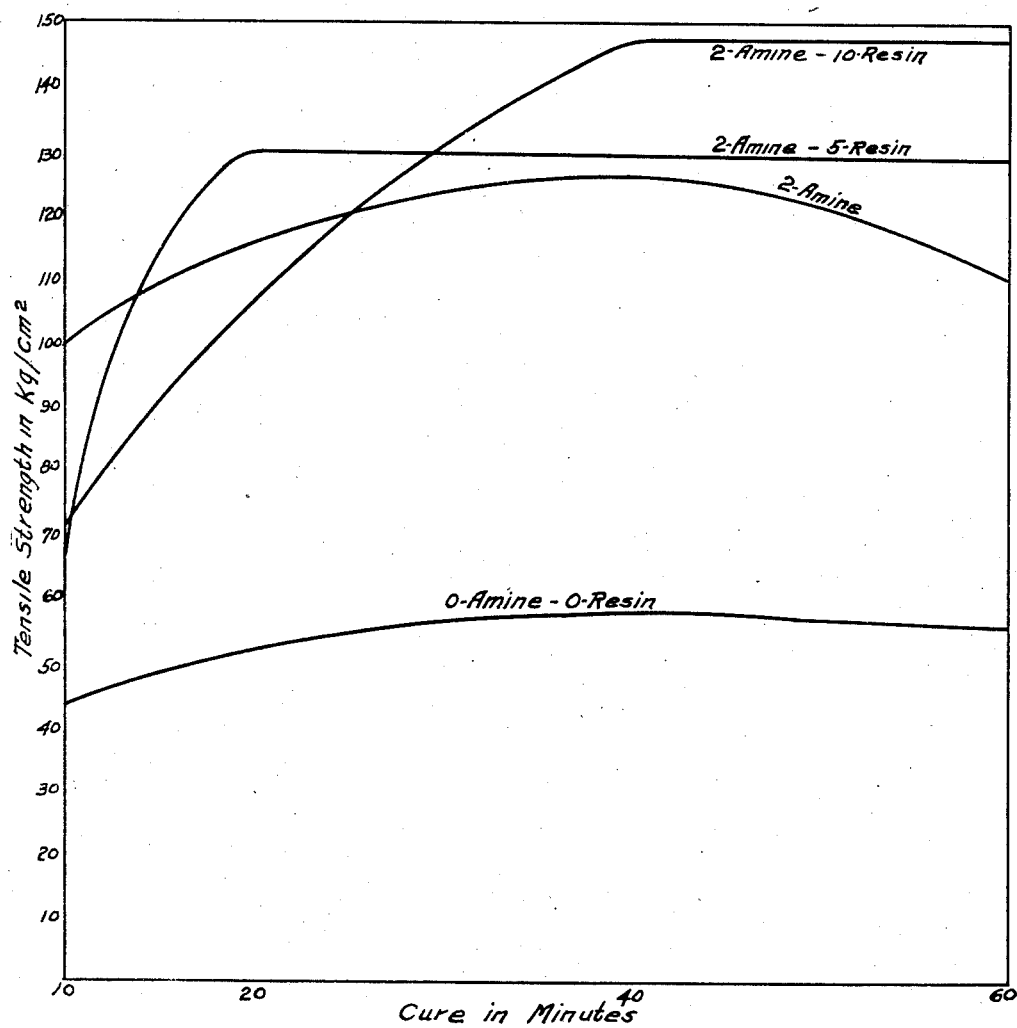

2,454,209

UNITED STATES PATENT OFFICE 2,454,209

PROCESS FOR MODIFYING VINYL CHLORIDE-VINYLIDENE CHLORIDE COPOLYMERS WITH PHENOL FORMALDEHYDE RESINS

Thomas H. Rogers, Jr., Akron, Ohio, and Robert D. Vickers, New Rochelle, N. Y., assignors to Wingfoot Corporation, Akron, Ohio, a corporation of Delaware Application September 28, 1944, Serial No. 556,152

1 Claim. (Cl. 260—43)

This invention relates to valuable thermosetting resin compositions and to methods of preparation thereof. More specifically, it relates to copolymers of vinyl chloride and vinylidene chloride modified by heating in the presence of small quantities of phenol-formaldehyde type resins.

Copolymers of vinyl chloride and vinylidene chloride are well known in the art. These copolymers are thermoplastic in nature and usually are not capable of being cured at elevated temperatures. Accordingly, the known uses of the copolymers are quite limited. It has long been apparent that methods of converting these thermoplastic materials into strong thermoset materials would greatly expand the utility of these resins.

In our copending application Serial No. 481,076 filed March 30, 1943 now abandoned and Serial No. 490,489 filed June 11, 1943, now Patent No. 2,421,852 we described and claimed methods of curing copolymers of vinyl chloride and vinylidene chloride by heating in the presence of amino compounds, particularly the aliphatic amines. In the latter application a procedure is described and claimed by which further beneficial properties are obtained through the use of phenolic resins.

These methods are particularly related to copolymers containing 75 to 90 percent of vinyl chloride and 10 to 25 percent of vinylidene chloride. It has been discovered that copolymers of this range of composition can be strengthened from 100 to more than 150 percent by the use of proper curing agents. On the other hand, the treatment of polyvinyl chloride in an identical manner will manifest increases of usually not more than 30 percent and frequently less than 20 percent. Vinyl chloride copolymers with vinyl acetate were also tested. One sample was found to have increased 48.2 percent in tensile strength but all of the other samples were improved less than 30 and most of them less than 20 percent.

In accordance with the method of this invention, desirable thermosetting resins can be prepared by curing copolymers, containing 1 part by weight of vinylidene chloride and from 3 to 9 parts of vinyl chloride, in the presence of both an N-cyclic amine and a substantial portion of a resin formed by condensing a phenol with an aldehyde. The copolymer is mixed with the cyclic amine, the phenolic resin, and other optional materials, as described below, in conventional rubber machinery, such as a roll mill or a Banbury mixer. The mixture is worked until a uniform homogeneous composition is produced. After milling, the compositions are soft and plastic especially at temperatures of 100° F. to 400° F. The soft material is sheeted or otherwise molded into a desired shape and cured by heating at 200° F. to 400° F. for 20 to 60 minutes.

Suitable N-cyclic amines for the practice of this invention are hexamethylene tetramine, piperidine, piperazine, morpholine, pyridine, quinoline, quinaldine, thiazine and thiazine derivatives such as

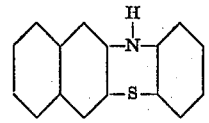

The quantity of amino compound used in the practice of this invention will vary between 1% and 10%, but best results are obtained by the use of between 4 and 6 percent.

The phenolic resin which is a critical component of the new composition may be any solid fusible condensation product of aldehyde and a phenol. By "phenol" any compound containing at least one hydroxyl group substituting on a benzene ring is contemplated. Thus the phenolic resins are any of the condensation products of the "B-stage," many of which are commercially available and sold as molding resins. The phenol formaldehyde resins may be added in proportions of 2 to 20 percent, and preferably from 5 to 10 percent, by weight based on the vinyl resin content of the composition.

In the practice of this invention, both phenolic resin and N-cyclic amine are necessary. A substantial cure is possible when the amine alone is used but very little improvement is noted when the phenolic resin is used without the N-cyclic amine. The purpose of the phenolic in the composition is to develop the improved tensile properties after shorter cure and to retain the properties through a longer cure period. Thus the dangers of over and under curing are substantially minimized.

If desired, our new compounds may be modified by the incorporation of other materials without substantially affecting the desirable properties. Thus, hydrogen acceptors, such as magnesium oxide, sodium carbonate, calcium oxide and magnesium carbonate may be added for the purpose of preventing deterioration of the composition at the elevated temperatures used in curing. Similarly, plasticizers such as dibutyl sebacate, methoxyethyl oleate, dioctyl phthalate, tributyl phosphate, and other plasticizers well known in the art, may be added in amounts up to 30% by weight of the entire composition. The proportions and types of plasticizers which may be used are well understood by the art. Pigments such as carbon black, calcium silicate, zinc oxide and calcium carbonate may be used in the manner of the prior art.

Further details of the manufacture of our new resins will be described with respect to specific examples, as follows:

Example 1

A copolymer of vinyl chloride and vinylidene chloride containing 85% of vinyl chloride was mixed with 25% dibutyl sebacate on a hot mill. After 10 minutes of mixing, 5 parts by weight of magnesium oxide (based on the total copolymer) were added. After thoroughly mixing, 2 parts by weight of hexamethylene tetramine and 5 parts by weight of cresol-formaldehyde resin were added. After the composition was thoroughly mixed, the stock was sheeted and samples cut for curing. The cure was effected by heating at 350° F. under a pressure of 1500 pounds per square inch.

Example 2

Using the procedure described in Example 1, a resinous composition was prepared of the following materials:

| | Parts by Weight |
|---|---|
| Vinyl-vinylidene chloride polymer (15% vinylidene chloride, 35% vinyl chloride | 100 |
| Dibutyl sebacate | 35 |
| Magnesium oxide | 5 |
| Cresol-formaldehyde resin | 10 |
| Hexamethylene tetramine | 2 |

The stock was cured as in Example 1.

Example 3

Using the procedure described in Example 1, a resinous composition was prepared of the following materials:

| | Parts by weight |
|---|---|
| Vinyl-vinylidene chloride polymer (15% vinylidene chloride, 85% vinyl chloride) | 100 |
| Dibutyl sebacate | 35 |
| Magnesium oxide | 2 |
| Cresol-formaldehyde resin | 10 |
| Hexamethylene tetramine | 2 |

The stock was cured as in Example 1.

In order to demonstrate the effect of the N-cyclic amine, two control tests were run on stocks identical to that of Example 3 except that in one the cresol-formaldehyde resin was omitted and in the other both the cresol-formaldehyde resin and hexamethylene tetramine were omitted.

The products of the examples and the control stocks were tested and the results tabulated in the following table:

| | Ex. 1 | Ex. 2 | Ex. 3 | Ex. 3 | Ex. 3 |
|---|---|---|---|---|---|
| Physical properties after 40 minute cure at 320° F | | | | No phenolic | No phenolic, no amine. |
| Hardness (type A Durometer) | 81 | 84 | 81 | 77 | 74. |
| Solubility in methyl ethyl ketone | No | No | No | No | Soluble. |
| Elongation, percent | 150 | 150 | 150 | 200 | 250. |
| Tensile strength, kg./cm.² | 125 | 148 | 140 | 126 | 58. |

It will be noticed that in each of the three examples, over 100% increase in tensile strength was developed by a forty minute cure. Comparisons of Example 3 with the control tests demonstrate that the amine alone will effect a cure but not to the extent that is produced by the presence of both phenolic and amine. A further benefit of the amine is clearly demonstrated by the drawing which is a graphical representation of the effect of curing time on the strength of the cured stock. When the amine alone is used the strength increases to a maximum and then becomes weaker. The presence of phenolic resin causes the strength to develop more rapidly and then to level off and exhibit little or no reduction upon continued cure. The principal advantage of a curing curve of this type lies in the case of approximating the optimum properties in the cured stock. Little or no danger of overcuring is encountered.

The new compositions may be used as substitutes for natural rubber since they may be calendered, molded, milled or compounded in the usual rubber machinery. Accordingly, heels, shoe soles, tires, inner tubes, electric insulation, tubing, belts, gaskets and other articles, requiring a tough, resilient material, may be fabricated.

In this specification the percentages of amine, phenolic resin and other modifying components, are based upon the copolymer content unless otherwise expressed.

This application is a continuation-in-part of our application Serial No. 490,489, filed June 11, 1943, now U. S. 2,421,852 issued June 10, 1947.

Although the invention has been described with respect to specific detailed examples, it is not intended that such details shall be limitations on the scope of the invention except as incorporated in the following claim.

We claim:

A method of preparing a thermoset copolymer of 75 to 90 percent of vinyl chloride and from 25 to 10 percent of vinylidene chloride which comprises incorporating from 1 to 10 percent of hexamethylenetetramine and from 2 to 20 percent of a heat-hardenable phenol-aldehyde condensation product, and heating the mixture at a temperature between 200 and 400° F. until a product is obtained which has a tensile strength at least fifty percent greater than the untreated copolymer.

THOMAS H. ROGERS, Jr.
ROBERT D. VICKERS.

REFERENCES CITED

The following references are of record in the file of this patent:

UNITED STATES PATENTS

| Number | Name | Date |
|---|---|---|
| 2,013,941 | Young | Sept. 10, 1935 |
| 2,117,591 | Alexander | May 17, 1938 |
| 2,148,831 | Raynolds | Feb. 28, 1939 |
| 2,245,742 | Alexander et al. | June 17, 1941 |
| 2,270,662 | Raney | Jan. 20, 1942 |
| 2,316,197 | Tucker | Apr. 13, 1943 |
| 2,336,792 | Langkammerer | Dec' 14, 1943 |
| 2,337,424 | Stoner | Dec. 21, 1943 |
| 2,421,852 | Rogers et al. | June 10, 1947 |